United States Patent [19]
Hickey

[11] 4,140,237
[45] Feb. 20, 1979

[54] CONTAINERS HAVING AN INFLATABLE TUBULAR SEAL

[75] Inventor: Christopher D. D. Hickey, Esher, England

[73] Assignee: Airflex Containers Limited, Ashford, England

[21] Appl. No.: 874,477

[22] Filed: Feb. 2, 1978

[30] Foreign Application Priority Data

Feb. 7, 1977 [GB] United Kingdom ............... 4987/77

[51] Int. Cl.² ............................................ B65D 53/00
[52] U.S. Cl. ................................... 220/232; 220/1.5; 150/0.5; 206/600
[58] Field of Search ............... 220/232, 1.5; 206/597, 206/497, 522, 600; 150/0.5

[56] References Cited
U.S. PATENT DOCUMENTS

| | | | |
|---|---|---|---|
| 3,221,921 | 12/1965 | Silverman | 220/232 |
| 3,850,214 | 11/1974 | Hickey | 150/0.5 |

*Primary Examiner*—George T. Hall
*Attorney, Agent, or Firm*—Young & Thompson

[57] ABSTRACT

A container of the kind having a cover, preferably an impermeable flexible cover, sealed to a base, an improved seal is provided comprising an endless slot or groove in the base into which the periphery of the cover fits adjacent a removable tube holder of resilient material carrying one or more inflatable sealing tubes, each extending around the slot or groove adjacent the cover. Each sealing tube, when inflated, protrudes out of an aperture in the holder to seal against the cover and, if the cover is flexible, to force it into sealing engagement with a wall of the slot or groove. The holder serves to locate the tubes, thereby enabling two or more tubes to be located at different depths in the slot or groove.

16 Claims, 2 Drawing Figures

CONTAINERS HAVING AN INFLATABLE TUBULAR SEAL

BACKGROUND OF THE INVENTION

1. Field of the Invention

This invention relates to containers of the kind having a base with a load-carrying surface and a cover which is sealed to the base by an inflatable tubular sealing member. Typically the base has an impermeable load-carrying surface, and the cover is a flexible impermeable envelope to cover goods on said base, which envelope is sealed to the base by an inflatable tubular sealing member extending around the periphery of the envelope to hold the envelope in airtight sealing engagement against a part of the base assembly.

2. Prior Art

Containers of this kind are used by putting the envelope of impermeable material over a load on the air-impermeable base and then sealing the periphery of the envelope to the base by an airtight seal; the space within the envelope may then be partially evacuated so that the reduced pressure holds the envelope tightly down onto the base; if the envelope is flexible it is drawn down onto the load and so holds the load firmly onto the base. In some cases the region inside the envelope may be pressurised, e.g. with dry air or an inert gas. Such packaging systems find particular application for loads which may have to be transported but which may also have to be stored for long periods. By evacuation, the envelope provides the required restraint on goods during transport and also serves to protect the goods during storage. Both for transport and for storage, it is necessary that the envelope should be sealed to the base in an airtight manner. For this purpose, it is known to use an inflatable tubular seal. Such a seal may be formed as a tube integral with or secured to the periphery of the envelope as described for example in U.S. Pat. No. 3,850,214 or it may be a separate tube either fitting in or secured to the base (see for example British Pat. No. 860,238). Very conveniently the periphery of the envelope is put within a slot or groove extending around the base and the aforementioned tube inflated to seal the periphery of the envelope against one or both walls of the slot or groove. For example, the tube may be placed within the slot or groove and the periphery of the envelope then put within the slot or groove between the tube and one side wall of the slot or groove; the tube is then inflated to press the envelope against that side wall.

It has been found that, particularly with long-term storage, there may be leakage from the tubular seal, for example a slow leak through the inflation valve, so that, after a long term, the tube has lost so much pressure that the seal is no longer airtight.

SUMMARY OF THE INVENTION

It is one of the objects of the present invention to provide an improved form of sealing for such a container.

According to this invention, a container comprises a base with a load-carrying surface and a cover sealed to the base by an inflatable tubular sealing member wherein the sealing member comprises at least one inflatable tube in an endless tube holder extending around an area of said base, the tube holder having an opening through which the tube, when inflated, projects along its whole length to seal against the periphery of the cover. The holder is preferably formed of resilient material and conveniently is housed in an endless channel on said base.

According to another aspect of the present invention, a container for goods comprises a base with an impermeable load-carrying surface, a flexible impermeable envelope and a pressure surface against which the periphery of the envelope is to be sealed to form a vacuum-tight container for goods enclosed between the envelope and the impermeable surface of the base, wherein, for sealing the periphery of the envelope against said pressure surface, wherein there are provided two separate sealing tubes which are separately inflatable and tube holder means locating said tubes with respect to said surface so that each tube extends around the peripheral portion of the envelope, one further inwardly from the edge thereof than the other, each inflatable tube arranged, on inflation, to force the adjacent part of the envelope towards said pressure surface. This pressure surface conveniently is one wall of a slot or groove on said base. Preferably said wall has a rib or other projection extending along its length in each of the regions where the envelope is forced by a tube against the wall so as to give a localised pressure point and thereby giving a tight seal.

In referring to a base with an impermeable surface, it will be understood that the impermeable surface might be formed integrally with a rigid base or it might be constituted, for example, by a further sheet of flexible material over a load-bearing base. If such a further sheet is provided, conveniently the peripheries of the two sheets are sealed together to form the airtight container by putting the peripheries of both sheets in said slot or groove and then inflating said tube. In referring in this specification to the pressing of the part of the envelope towards said wall or other pressure surface, it will be understood that this includes arrangements in which, if a further sheet is used over the base, the peripheries of both sheets may together be pressed against said wall or other surface. The aforementioned slot or groove may be an integral part of the base or attached thereto in an airtight manner or, if a further sheet is used, it may merely be carried on said base.

In the known way provision may be made for partially evacuating the interior of the envelope so that the latter is held down by air pressure to restrain goods on said base. Provision may also be made for inflating the envelope, for example with an inert gas or with dry air. The base may conveniently be a pallet having apertures to accept the prongs of a fork-lift truck.

If the aforementioned wall forms one side of a groove or slot in the base, the aforementioned tubes may be located in said slot or groove. In order to facilitate proper location of said tubes in such a groove or slot, said tube holder means conveniently comprises a removable locating member which holds the tubes and into which the tubes may be assembled before the locating member is put in said slot or groove. This locating member preferably has portions extending around a major part of the periphery of each of said tubes with openings in said member opposite said side wall, through which openings the tubes, on inflation, may extend so as to apply pressure to the edge of the envelope which is placed between said wall and the tube and tube holder assembly in said slot or groove. By this construction, it becomes readily possible to insert or remove the sealing tubes from the assembly yet the sealing tubes are accurately located so that they can apply pressure to the envelope opposite the aforementioned ribs or projections.

The provision of a tube holder along the length of the tube or tubes and extending around the major part of the periphery of the tubular seal constrains the expansion of the tube and localises it in the required position. Such a tube holder thus, in itself, gives an advantage over constructions heretofore in which the inflatable tubular seal has not been so constrained.

Thus the invention further includes within its scope a container for goods of the kind having a base with an impermeable surface and a flexible impermeable envelope which is sealed to said impermeable surface by an inflatable tube urging the envelope, near its peripheral edge, against a pressure surface constituted by a side wall of a slot or groove wherein the tube is arranged in a tube holder withdrawable from said slot or groove, the tube holder embracing a major part of the periphery of the tube along its length to prevent expansion of the tube except through an opening in the tube holder facing said side wall, the peripheral portion of the envelope being placed in said slot or groove between the side wall and said tube and tube holder so that the tube, on inflation, presses a part of said envelope against said side wall. As previously indicated, preferably said side wall has a rib or projection extending along the length thereof to form a pressure point where the envelope is to be pressed against a side wall.

The tube holder preferably is in the form of a rigid chamber holding said sealing tube along the whole of its length and embracing a major portion of the periphery of the tube. By the use of this rigid chamber, it becomes possible to use a higher pressure in the sealing tube than has heretofore been possible with unconstrained sealing tubes and hence a greater pressure may be exerted on the envelope against said side wall. When the sealing tube is inflated, expansion is constrained except in the region where pressure is to be exerted onto the envelope.

The sealing tube may be of cylindrical section. However, non-cylindrical sections may be employed, for example an ovoid section tube or lay-flat tube. In one convenient form of construction, the tube is of section which is cylindrical around the arc thereof lying within said chamber which is also of cylindrical section, the arcuate portion of the periphery of the tube adjacent the opening along the length of said chamber being formed so that, in the uninflated condition, this portion lies just within the chamber to facilitate insertion of the edge of the envelope between said tube holder and said side wall. This portion of the tube periphery may for example, in the uninflated condition, bulge inwardly; when the tube is inflated this portion will bulge outwardly against the surface of said envelope.

DESCRIPTION OF THE PREFERRED EMBODIMENTS

Figure 1:
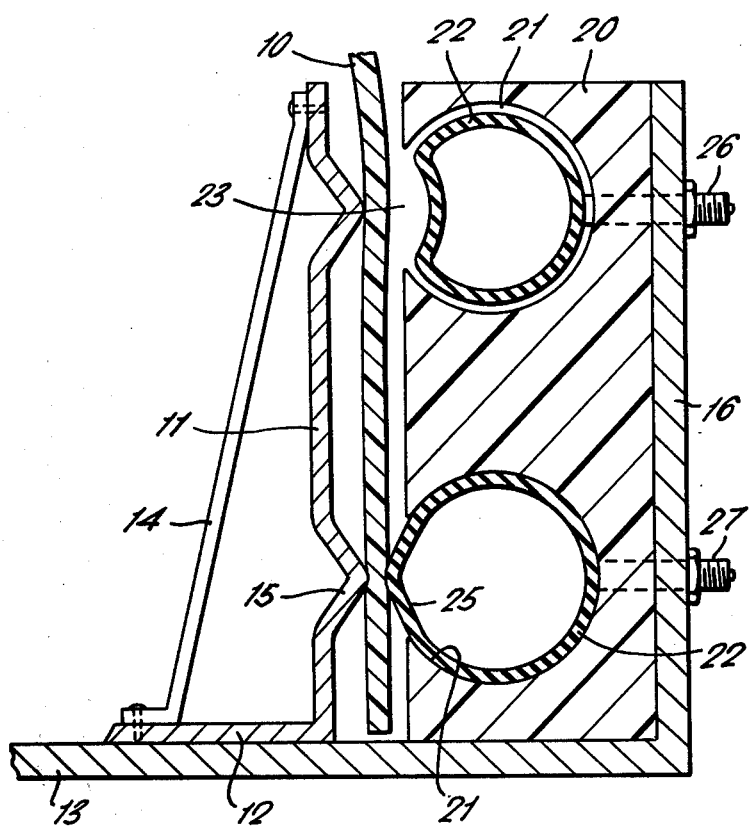
FIG. 1 is a diagrammatic cross-section through part of the sealing system for sealing an envelope of flexible impermeable material to the base of a container in a first embodiment of the invention.

FIG. 1 shows part of the peripheral portion 10 of a flexible sheet of impermeable material, for example butyl rubber, which is to be sealed against a pressure plate 11 forming an upright side wall of a tray 12 extending over and forming part of the base of a container 13. The tray may be impermeable or the container may be impermeable or they may be covered with an impermeable sheet in order to form an airtight support surface for carrying goods. The goods may rest on this surface or be carried above it in the known way, e.g. on shock-absorbing mounts. In the known way also this base may be arranged as part of a pallet having openings for handling by a fork-lift truck. Provision is made also in the known way for evacuating the region between the impermeable base and the envelope and/or for pressurising this region, for example with an inert gas or dry air.

The present invention is concerned more particularly with the sealing of the periphery of the envelope 10 against the pressure plate 11. This pressing plate is supported at intervals along its length by stiffeners 14 to enable it to withstand the pressures to be applied as described hereinafter. Sealing is effected, in this particular embodiment, along the length of two ribs 15 formed in the side wall 11, these ribs extending along the whole length of the side wall, which side wall extends around the whole of the container just inwardly from the periphery thereof. The base of the container has a further upright wall 16 spaced away from the pressure wall 11 so that the two walls 11, 16 form a channel or groove lying between these upright walls. Within this channel or groove is positioned a rigid metal or plastics element 20 having two chambers 21 extending along the length of the element, which element may be an endless element or conveniently is formed in a number of sections which together extend along the whole length of the endless channel or groove. In each of these chambers is located an inflatable tube 22 of resilient material. In the embodiment of FIG. 1 the upper one of these tubes is uninflated and, in this condition, it is of non-circular form. The tube is shaped so that it is closely embraced over a substantial part of its circumference by the wall of the chamber 21. This chamber has an opening 23 opposite one of the aforementioned ribs 13 and the part of the tube 22 adjacent this opening 23 is shaped so that, in the uninflated condition, it lies just inwardly of the outer surface of the tube holder as shown for the upper tube in the drawing. The other tube is a similar tube but is shown in the inflated condition; when so inflated, the part adjacent the opening in the chamber bulges outwardly as shown at 25 to apply pressure to the aforementioned sheet 10 so that it is compressed between this tube and one of the ribs 13 thereby sealing the envelope against that rib.

With the tubes in the deflated condition, the tube holder 20 and tube 22 can be withdrawn from said slot or groove and it becomes readily possible to remove and replace the tubes. Each tube is provided with a separate inflation system. Conveniently inflation valves as shown at 26, 27 extend outwardly through an upright slot in the aforementioned outer wall 16 to permit withdrawal of the tube holder and tubes with these valves. Because the tubes are confined within chambers closely embracing the tubes over the greater part of the periphery, it is possible to use higher pressures than has heretofore been the practice in tubular seals for containers and hence to get higher pressure exerted on the sheet 10 pressing it against the rib in the pressure wall. The use of this form of tube and tube container thus, in itself, enables an improved seal to be obtained. By providing two separate sealing tubes however as shown in the diagram, an effective seal is still maintained even if one of the tubes should lose pressure.

Although specifically shaped sealing tubes have been illustrated in FIG. 1, other shapes may be used such as cylindrical or ovoid or lay-flat tubing.

Figure 2:
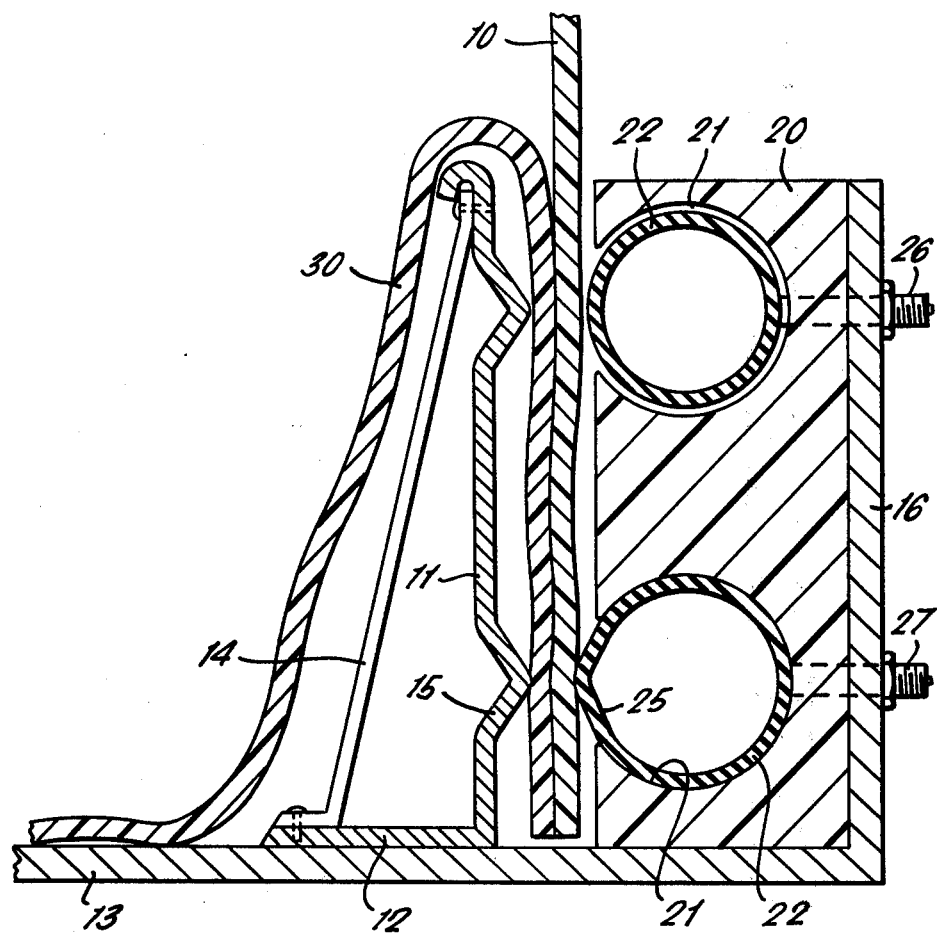
FIG. 2 is a view similar to FIG. 1 of another construction of container forming a second embodiment of the invention.

FIG. 2 illustrates a modification of the container of FIG. 1. The same reference numerals are used to indicate corresponding components and, in the following description, mention will be made only of the distinctive features. In this embodiment, the base 13 of the container need not be impermeable to air as it is covered by a flexible impermeable sheet 30 the peripheral edge of which extends around the top of the wall 11 to lie between that wall and the cover sheet 10. Thus, when the two tubes 22 are inflated, the sheets are pressed together around their complete peripheries to seal the container.

In FIG. 2, cylindrical section tubes 22 are shown. The upper one, shown uninflated, is a loose fit in its chamber 21. The lower tube 22 is shown inflated; where it lies inside the chamber 21, it is restrained to the shape of the chamber wall but it bulges at 25 through the opening to press the sheets 10, 30 together.

I claim:

1. A container for goods comprising a base with an impermeable load-carrying surface, a flexible impermeable envelope and a pressure surface against which the periphery of the envelope is to be sealed to form a vacuum-tight container for goods enclosed between the envelope and the impermeable surface of the base, wherein, for sealing the periphery of the envelope against said pressure surface, there are provided two separate sealing tubes which are separately inflatable and tube holder means locating said tubes with respect to said surface so that each tube extends around the peripheral portion of the envelope, one further inwardly from the edge thereof than the other, each inflatable tube arranged, on inflation, to force the adjacent part of the envelope towards said pressure surface.

2. A container as claimed in claim 1 wherein said pressure surface is one wall of a slot or groove on said base.

3. A container as claimed in claim 2 wherein said wall has a rib or other projection extending along its length in each of the regions where the envelope is forced by a tube against the wall so as to give a localised pressure point and thereby giving a tight seal.

4. A container as claimed in claim 2 wherein said impermeable surface is constituted by a further sheet of flexible material over a load-bearing base and wherein the peripheries of the two sheets are put in said slot or groove before said tubes are inflated to seal the sheets together.

5. A container as claimed in claim 1 wherein means are provided for partially evacuating the interior of the envelope so that the latter is held down by air pressure to restrain goods on said base.

6. A container as claimed in claim 1 and wherein said pressure surface is a wall forming one side of a groove or slot in the base, and wherein said tubes are located in said slot or groove.

7. A container as claimed in claim 6 wherein said tube holder means comprises a removable locating member in said slot or groove, which member holds the tubes.

8. A container as claimed in claim 7 wherein said locating member has portions extending around a major part of the periphery of each of said tubes, with openings in said member opposite said wall, through which openings the tubes, on inflation, extend so as to apply pressure to the edge of the envelope which is placed between said wall and the tube and tube holder assembly in said slot or groove.

9. A container for goods of the kind having a base with an impermeable surface and a flexible impermeable envelope which is sealed to said impermeable surface by an inflatable tube urging the envelope, near its peripheral edge, against a pressure surface constituted by a side wall of a slot or groove wherein the tube is arranged in a tube holder withdrawable from said slot or groove, the tube holder embracing a major part of the periphery of the tube along its length to prevent expansion of the tube except through an opening in the tube holder facing said side wall, the peripheral portion of the envelope being placed in said slot or groove between the side wall and said tube and tube holder so that the tube, on inflation, presses a part of said envelope against said side wall.

10. A container as claimed in claim 9 wherein said side wall has a rib or projection extending along the length thereof to form a pressure point where the envelope is to be pressed against a side wall.

11. A container as claimed in claim 9 wherein said tube holder is a rigid chamber holding said sealing tube along the whole of its length.

12. A container as claimed in claim 9 wherein the sealing tube is of cylindrical section.

13. A container as claimed in claim 9 wherein the sealing tube is of non-cylindrical section.

14. A container comprising a base with a load-carrying surface, said base having channel-defining means forming an endless upwardly facing channel around an area of said surface, said channel having at least one upright side wall, an inflatable sealing tube, a tube holder withdrawably located in and extending along the length of said channel, said tube holder having a cavity with an opening facing but spaced from said upright side wall, said sealing tube being housed within the cavity in the tube holder and protruding, when inflated, through said opening towards said side wall, and a cover having a peripheral portion fitting in said channel between said side wall and said tube holder so as to be sealed to the base by inflation of said inflatable sealing tube.

15. A container as claimed in claim 14 wherein the holder is formed of resilient material.

16. A container as claimed in claim 14 wherein the tube holder in said channel surrounds the periphery of said cover so that the inflatable tube seals against an outer surface of the cover.

* * * * *